US012706641B2

(12) United States Patent
Farmanbar et al.

(10) Patent No.: US 12,706,641 B2
(45) Date of Patent: Aug. 11, 2026

(54) SYSTEMS AND METHODS FOR CHANNEL STATE INFORMATION ACQUISITION USING A JOINT SPACE-FREQUENCY SUBSPACE

(71) Applicant: Huawei Technologies Co., Ltd., Shenzhen (CN)

(72) Inventors: Hamidreza Farmanbar, Ottawa (CA); Mohammadhadi Baligh, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/896,043

(22) Filed: Sep. 25, 2024

(65) Prior Publication Data

US 2025/0055522 A1 Feb. 13, 2025

Related U.S. Application Data

(63) Continuation of application No. PCT/CN2022/084142, filed on Mar. 30, 2022.

(51) Int. Cl.
*H04B 7/06* (2006.01)

(52) U.S. Cl.
CPC .................................. *H04B 7/0617* (2013.01)

(58) Field of Classification Search
CPC ............................ H04B 7/0617; H04B 7/0417
See application file for complete search history.

(56) References Cited

U.S. PATENT DOCUMENTS 11,996,910 B2 5/2024 Ramireddy et al.

FOREIGN PATENT DOCUMENTS

| | | | | |
|---|---|---|---|---|
| CN | 111757382 A | | 10/2020 | |
| CN | 111865376 A | | 10/2020 | |
| CN | 112311431 A | | 2/2021 | |
| CN | 112997418 A | | 6/2021 | |
| WO | WO-2019237344 A1 | * | 12/2019 | ............. H04L 69/04 |

* cited by examiner

*Primary Examiner* — Rahel Guarino
(74) *Attorney, Agent, or Firm* — Slater Matsil, LLP

(57) ABSTRACT

Aspects of the present disclosure are directed to channel state information (CSI) acquisition and feedback where the UE estimates the channel based on a received reference signal (such as a channel state information reference signal (CSI-RS)) and calculates an appropriate precoder matrix according to the measured channel. The UE can then send a compressed version of the precoder matrix based on a set of joint space-frequency subspace vectors to the base station that can be used by the base station in order to recover the precoder matrix from the compressed version of the precoder matrix.

20 Claims, 6 Drawing Sheets

SYSTEMS AND METHODS FOR CHANNEL STATE INFORMATION ACQUISITION USING A JOINT SPACE-FREQUENCY SUBSPACE

CROSS REFERENCE

This application is a continuation of International Application No. PCT/CN2022/084142, filed on Mar. 30, 2022, the disclosure of which is hereby incorporated by reference in its entirety.

TECHNICAL FIELD

The present disclosure relates generally to wireless communications, and in particular embodiments, systems and methods for channel state information (CSI) acquisition through use of a joint space-frequency subspace learning.

BACKGROUND

In some wireless communication systems, user equipments (UEs) wirelessly communicate with a base station (for example, NodeB, evolved NodeB or gNB) to send data to the base station and/or receive data from the base station. A wireless communication from a UE to a base station is referred to as an uplink (UL) communication. A wireless communication from a base station to a UE is referred to as a downlink (DL) communication. A wireless communication from a first UE to a second UE is referred to as a sidelink (SL) communication or device-to-device (D2D) communication.

Resources are required to perform uplink, downlink and sidelink communications. For example, a base station may wirelessly transmit data, such as a transport block (TB), to a UE in a downlink transmission at a particular frequency and over a particular duration of time. The frequency and time duration used are examples of resources.

As a part of establishing a communication link between a base station and UE the UE performs channel state acquisition and feeds back the channel state information (CSI) to the base station to enable the base station to determine a precoder matrix. Precoding is a technique that is used by a multiple antenna transmitter to maximize receive signal-to-noise (SNR) and/or to enable transmitting multiple data streams. A precoder matrix is a simple manner of representing the weighting information in a matrix format. The terms precoder and precoding matrix may be used herein interchangeable to refer to the same feature.

In order to perform channel state acquisition the UE estimates the channel based on measuring a received reference signal and determining an appropriate precoder matrix according to the estimated channel. The UE then feeds back CSI. How to reduce overhead and latency is a problem that need to be solved.

SUMMARY

Existing methods that may consider compression of feedback information from the UE to the base station while considering the correlation between both space and frequency. However, those methods still have shortcomings. For example, those methods treat subspaces of antennas and frequency sub-bands as separate subspaces, not as a single subspace. Treating the subspaces as separate subspaces may negatively impact compression performance. In addition, a choice of space and frequency beams is based on heuristics and is not necessarily optimized.

According to some aspects of the present disclosure, there is provided a method involving transmitting, by a base station, joint space-frequency subspace configuration information for use by a user equipment (UE) to determine a compressed precoder, wherein a joint space-frequency subspace combines information of an antenna subspace and a frequency subspace into a single subspace.

In some embodiments, the joint space-frequency subspace configuration information comprises antenna parameter information and sub-band parameter information to determine a set of joint space-frequency subspace vectors for use at the UE that are consistent with a set of joint space-frequency subspace vectors known at the base station.

In some embodiments, the antenna parameter information comprises at least one of: a number of antenna elements in the antenna in a first direction; a number of antenna elements in the antenna in a second direction perpendicular to the first direction; an oversampling factor corresponding to the first direction; and an oversampling factor corresponding to the second direction.

In some embodiments, the sub-band parameter information comprises at least one of: a discrete Fourier transform (DFT) length corresponding to the number of sub-bands; and an oversampling factor.

In some embodiments, the joint space-frequency subspace configuration information is a set of joint space-frequency subspace vectors.

In some embodiments, the method further involves determining, by the base station, the set of joint space-frequency subspace vectors that are vectors corresponding to historically obtained channel state information (CSI) feedback from one or more UEs.

In some embodiments, the set of joint space-frequency subspace vectors are determined using machine learning or artificial intelligence techniques.

In some embodiments, the set of joint space-frequency subspace vectors are determined using principal component analysis (PCA).

In some embodiments, the transmitting the joint space-frequency subspace configuration information comprises transmitting the joint space-frequency subspace configuration information in radio resource control (RRC) signaling.

According to some aspects of the present disclosure, there is provided a device including a processor and a computer-readable medium. The computer-readable medium has stored thereon, computer executable instructions, that when executed cause the processor to perform a method as described above or detailed below.

According to some aspects of the present disclosure, there is provided a method comprising: transmitting, by a base station, at least one reference signal; receiving, by the base station, compressed precoder information comprising indices of a plurality of vectors and coefficients corresponding to the plurality of vectors, the compressed precoder information based on a precoder determined from measurement at a UE of the at least one reference signal, wherein the plurality of vectors are selected from a set of joint space-frequency subspace vectors that are based on an antenna subspace and a frequency subspace combined into a single subspace; determining, by the base station, the precoder based on the received compressed precoder information and knowledge at the base station of the set of joint space-frequency space vectors.

In some embodiments, the at least one reference signal is at least one CSI reference signal.

In some embodiments, the precoder is for a number of transmission layers and a number of frequency sub-bands.

According to some aspects of the present disclosure, there is provided a device including a processor and a computer-readable medium. The computer-readable medium has stored thereon, computer executable instructions, that when executed cause the processor to perform a method as described above or detailed below.

According to some aspects of the present disclosure, there is provided a method comprising: receiving, by a UE, joint space-frequency subspace configuration information for use by the UE to determine a compressed precoder, wherein a joint space-frequency subspace combines information of an antenna subspace and a frequency subspace into a single subspace.

In some embodiments, the joint space-frequency subspace configuration information comprises antenna parameter information and sub-band parameter information to determine a set of joint space-frequency subspace vectors for use at the UE that are consistent with a set of joint space-frequency subspace vectors known at the base station; and further comprising determining, by the UE, a set of joint space-frequency subspace vectors based on the joint space-frequency subspace configuration information.

In some embodiments, the antenna parameter information comprises at least one of: a number of antenna elements in the antenna in a first direction; a number of antenna elements in the antenna in a second direction perpendicular to the first direction; an oversampling factor corresponding to the first direction; and an oversampling factor corresponding to the second direction.

In some embodiments, the sub-band parameter information comprises at least one of: a DFT length corresponding to the number of sub-bands; and an oversampling factor.

In some embodiments, the joint space-frequency subspace configuration information is a set of joint space-frequency subspace vectors.

In some embodiments, the method further involves determining, by the base station, the set of joint space-frequency subspace vectors that are vectors corresponding to historically obtained CSI feedback from one or more UEs.

In some embodiments, the set of joint space-frequency subspace vectors are determined using machine learning or artificial intelligence techniques.

In some embodiments, the set of joint space-frequency subspace vectors are determined using PCA.

In some embodiments, the receiving the joint space-frequency subspace configuration information comprises receiving the joint space-frequency subspace configuration information in RRC signaling.

According to some aspects of the present disclosure, there is provided a device including a processor and a computer-readable medium. The computer-readable medium has stored thereon, computer executable instructions, that when executed cause the processor to perform a method as described above or detailed below.

According to some aspects of the present disclosure, there is provided a method comprising: receiving, by the UE, at least one reference signal; measuring, by the UE, the at least one reference signal; determining, by the UE, a precoder based on the measurement of the at least one reference signal; selecting, by the UE, a plurality of vectors from a first set of joint space-frequency subspace vectors, each vector having a corresponding coefficient, the selection based on the determined precoder, wherein the plurality of vectors are selected from a set of joint space-frequency subspace vectors that are based on an antenna subspace and a frequency subspace combined into a single subspace and wherein indices of the plurality of vectors and the corresponding coefficients are compressed precoder information; and transmitting, by the UE, the compressed precoder information.

In some embodiments, the at least one reference signal is at least one CSI reference signal.

In some embodiments, the precoder is determined for a number of transmission layers and a number of frequency sub-bands.

According to some aspects of the present disclosure, there is provided a device including a processor and a computer-readable medium. The computer-readable medium has stored thereon, computer executable instructions, that when executed cause the processor to perform a method as described above or detailed below.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF THE EMBODIMENTS

Figure 1A:
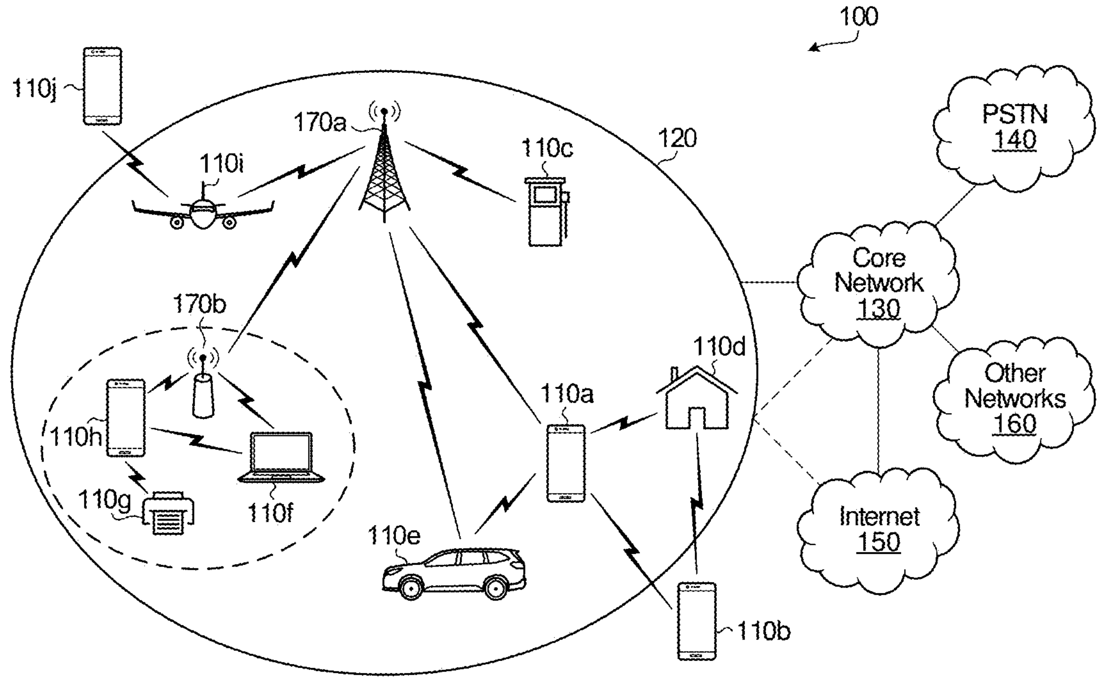
FIG. 1A is a schematic diagram of a communication system in which embodiments of the disclosure may occur.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Aspects of the present disclosure are directed to channel state information (CSI) acquisition and feedback where the UE estimates the channel based on a received reference signal (such as a channel state information reference signal (CSI-RS)) and calculates an appropriate precoder matrix according to the measured channel. The UE can then send a compressed version of the precoder matrix based on and a set of joint space-frequency subspace vectors to the base station that can be used by the base station in order to recover the precoder matrix from the compressed version of the precoder matrix. By compressing the precoder matrix information feedback overhead may be reduced.

CSI acquisition and feedback procedures in New Radio (NR) Release (Rel) 15 takes advantage of correlation that occurs across antennas (i.e. space). In Rel 15, a precoding vector for layer r and sub-band k is represented as $$w^{(r)}(k) = W_s \tilde{w}^{(r)}(k) \quad (1)$$

where columns of $W_s$ comprise L two dimensional discrete Fourier transform (2D-DFT) beams. According to the above equation, the precoding vectors are represented as a linear combination of columns of $W_s$. CSI feedback comprises the index of L beams and the corresponding coefficients $\tilde{w}^{(r)}(k)$.

NR Rel 16 provides a compression mechanism for compressing the CSI by considering correlation across sub-bands in addition to antennas. In NR Rel 16, the precoding matrix for layer r for a number of sub-bands is represented as $$W^{(r)} = W_s \tilde{W}^{(r)} W_f^{(r)*} \quad (2)$$

where columns of $W_s$ define the antenna (i.e. space) subspace and the columns of $$W_f^{(r)}$$

define the sub-band (i.e. frequency) subspace. CSI feedback for Rel. 16 comprises the indices of 2D-DFT beams in $W_s$ and the indices of DFT vectors in $$W_f^{(r)*}$$

and the corresponding matrix $\tilde{W}^{(r)}$. Although the method in NR Rel 16 considers the correlation across both space and frequency, the method still has two shortcomings. Firstly, it treats the subspaces of antennas and sub-bands as separate subspaces, not as a single subspace, and this can negatively impact compression performance. Secondly, the choice of space and frequency beams is based on heuristics and is not necessarily optimized.

An aspect of the present disclosure is to introduce a single subspace that is a joint space-frequency subspace rather than two separate space and frequency subspaces. Another aspect of the present disclosure is to represent a precoder matrix using vectors of the joint space-frequency subspace.

Figure 1B:
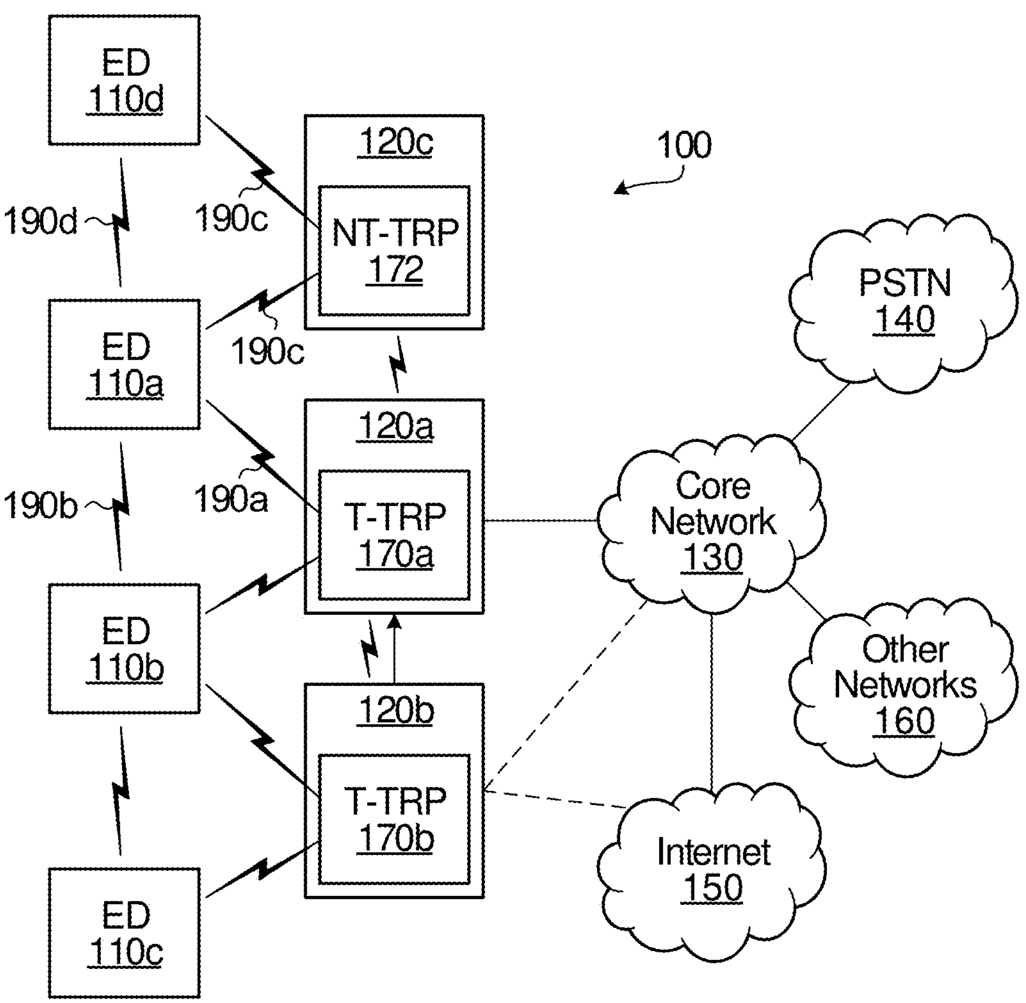
FIG. 1B is another schematic diagram of a communication system in which embodiments of the disclosure may occur.
Figure 2:
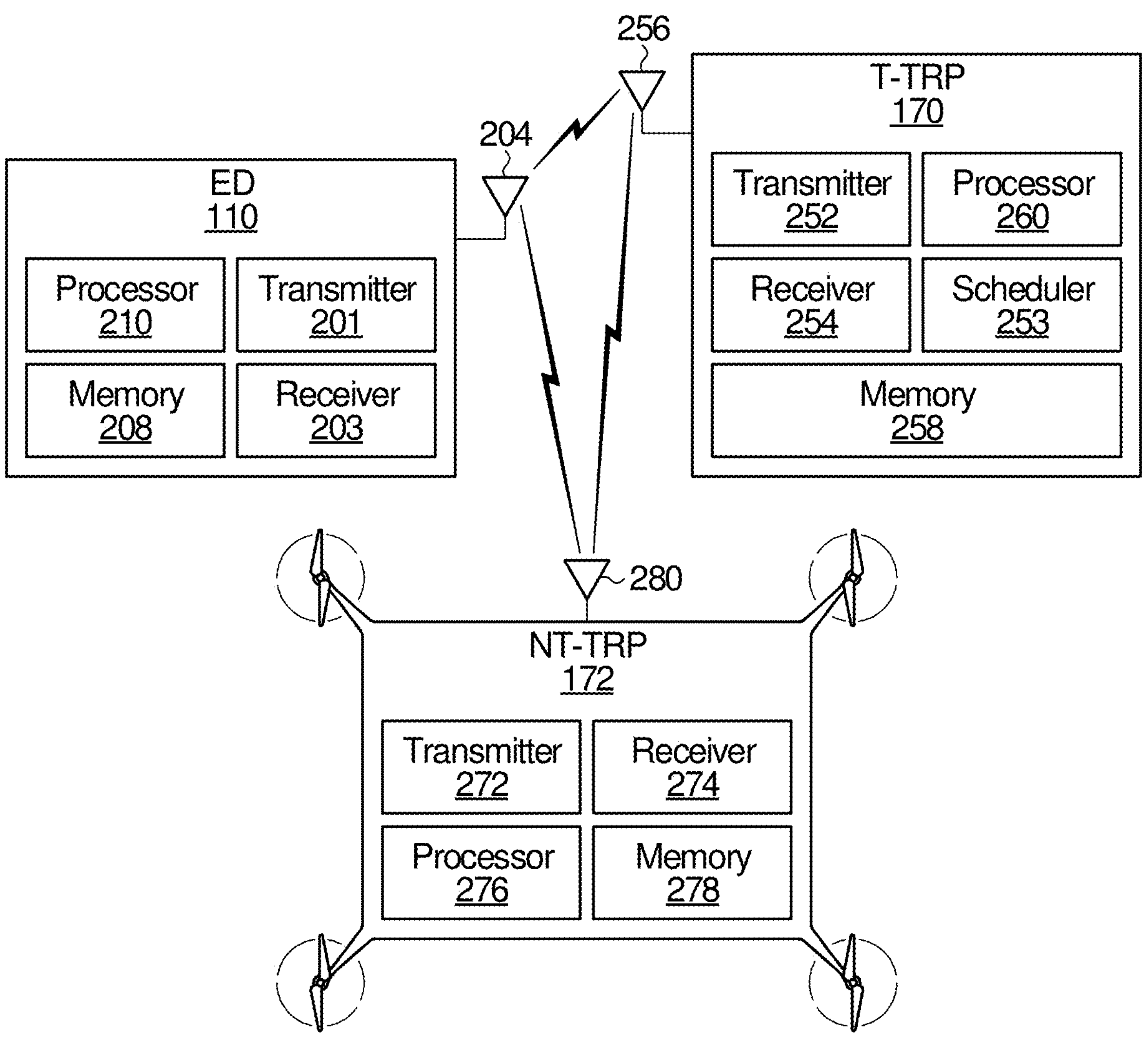
FIG. 2 is a block diagram illustrating units or modules in a device in which embodiments of the disclosure may occur.

FIGS. 1A, 1B, and 2 following below provide context for the network and device that may be in the network and that may implement aspects of the present disclosure.

Referring to FIG. 1A, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110*a*-120*j* (generically referred to as 110) may be interconnected to one another, and may also or instead be connected to one or more network nodes (170*a*, 170*b*, generically referred to as 170) in the radio access network 120. A core network 130 may be a part of the communication system and may be dependent or independent of the radio access technology used in the communication system 100. Also the communication system 100 comprises a public switched telephone network (PSTN) 140, the internet 150, and other networks 160.

FIG. 1B illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110*a*-110*c*, radio access networks (RANs) 120*a*-120*b*, a core network 130, a public switched telephone network (PSTN) 140, the Internet 150, and other networks 160. While certain numbers of these components or elements are shown in FIG. 2, any reasonable number of these components or elements may be included in the system 100.

The EDs 110*a*-110*c* are configured to operate, communicate, or both, in the system 100. For example, the EDs 110*a*-110*c* are configured to transmit, receive, or both via wireless communication channels. Each ED 110*a*-110*c* represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1B illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110_a_-110_c_, radio access networks (RANs) 120_a_-120_b_, a core network 130, a public switched telephone network (PSTN) 140, the internet 150, and other networks 160. Although certain numbers of these components or elements are shown in FIG. 1B, any reasonable number of these components or elements may be included in the communication system 100.

The EDs 110_a_-110_c_ are configured to operate, communicate, or both, in the communication system 100. For example, the EDs 110_a_-110_c_ are configured to transmit, receive, or both, via wireless or wired communication channels. Each ED 110_a_-110_c_ represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1B, the RANs 120_a_-120_b_ include base stations 170_a_-170_b_, respectively. Each base station 170_a_-170_b_ is configured to wirelessly interface with one or more of the EDs 110_a_-110_c_ to enable access to any other base station 170_a_-170_b_, the core network 130, the PSTN 140, the internet 150, and/or the other networks 160. For example, the base stations 170_a_-170_b_ may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router.

In some examples, one or more of the base stations 170_a_-170_b_ may be a terrestrial base station that is attached to the ground. For example, a terrestrial base station could be mounted on a building or tower. Alternatively, one or more of the base stations 170_a_-170_b_ may be a non-terrestrial base station that is not attached to the ground. A flying base station is an example of the non-terrestrial base station. A flying base station may be implemented using communication equipment supported or carried by a flying device. Non-limiting examples of flying devices include airborne platforms (such as a blimp or an airship, for example), balloons, quadcopters and other aerial vehicles. In some implementations, a flying base station may be supported or carried by an unmanned aerial system (UAS) or an unmanned aerial vehicle (UAV), such as a drone or a quadcopter. A flying base station may be a moveable or mobile base station that can be flexibly deployed in different locations to meet network demand. A satellite base station is another example of a non-terrestrial base station. A satellite base station may be implemented using communication equipment supported or carried by a satellite. A satellite base station may also be referred to as an orbiting base station.

Any ED 110_a_-110_c_ may be alternatively or additionally configured to interface, access, or communicate with any other base station 170_a_-170_b_, the internet 150, the core network 130, the PSTN 140, the other networks 160, or any combination of the preceding.

The EDs 110_a_-110_c_ and base stations 170_a_-170_b_ are examples of communication equipment that can be configured to implement some or all of the operations and/or embodiments described herein. In the embodiment shown in FIG. 1B, the base station 170_a_ forms part of the RAN 120_a_, which may include other base stations, base station controller(s) (BSC), radio network controller(s) (RNC), relay nodes, elements, and/or devices. Any base station 170_a_, 170_b_ may be a single element, as shown, or multiple elements, distributed in the corresponding RAN, or otherwise. Also, the base station 170_b_ forms part of the RAN 120_b_, which may include other base stations, elements, and/or devices. Each base station 170_a_-170_b_ transmits and/or receives wireless signals within a particular geographic region or area, sometimes referred to as a "cell" or "coverage area". A cell may be further divided into cell sectors, and a base station 170_a_-170_b_ may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RAN 120_a_-120_b_ shown is exemplary only. Any number of RAN may be contemplated when devising the communication system 100.

The base stations 170_a_-170_b_ communicate with one or more of the EDs 110_a_-110_c_ over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170_a_-170_b_ may implement Universal Mobile Telecommunication System (UMTS) Terrestrial Radio Access (UTRA) to establish an air interface 190 using wideband CDMA (WCDMA). In doing so, the base station 170_a_-170_b_ may implement protocols such as High Speed Packet Access (HSPA), Evolved HPSA (HSPA+) optionally including High Speed Downlink Packet Access (HSDPA), High Speed Packet Uplink Access (HSPUA) or both. Alternatively, a base station 170_a_-170_b_ may establish an air interface 190 with Evolved UTMS Terrestrial Radio Access (E-UTRA) using LTE, LTE-A, and/or LTE-B. It is contemplated that the communication system 100 may use multiple channel access operation, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120_a_-120_b_ are in communication with the core network 130 to provide the EDs 110_a_-110_c_ with various services such as voice, data, and other services. The RANs 120_a_-120_b_ and/or the core network 130 may be in direct or indirect communication with one or more other RANs (not shown), which may or may not be directly served by core network 130, and may or may not employ the same radio access technology as RAN 120_a_, RAN 120_b_ or both. The core network 130 may also serve as a gateway access between (i) the RANs 120_a_-120_b_ or EDs 110_a_-110_c_ or both, and (ii) other networks (such as the PSTN 140, the internet 150, and the other networks 160).

The EDs 110_a_-110_c_ communicate with one another over one or more sidelink (SL) air interfaces 180 using wireless communication links e.g. radio frequency (RF), microwave, infrared (IR), etc. The SL air interfaces 180 may utilize any suitable radio access technology, and may be substantially similar to the air interfaces 190 over which the EDs 110*a*-110*c* communication with one or more of the base stations 170*a*-170*c*, or they may be substantially different. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the SL air interfaces 180. In some embodiments, the SL air interfaces 180 may be, at least in part, implemented over unlicensed spectrum.

In addition, some or all of the EDs 110*a*-110*c* may include operation for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110*a*-110*c* may be multimode devices capable of operation according to multiple radio access technologies, and incorporate multiple transceivers necessary to support multiple radio access technologies.

In some embodiments, the signal is transmitted from a terrestrial BS to the UE or transmitted from the UE directly to the terrestrial BS and in both cases the signal is not reflected by a RIS. However, the signal may be reflected by the obstacles and reflectors such as buildings, walls and furniture. In some embodiments, the signal is communicated between the UE and a non-terrestrial BS such as a satellite, a drone and a high altitude platform. In some embodiments, the signal is communicated between a relay and a UE or a relay and a BS or between two relays. In some embodiments, the signal is transmitted between two UEs. In some embodiments, one or multiple RIS are utilized to reflect the signal from a transmitter and a receiver, where any of the transmitter and receiver includes UEs, terrestrial or non-terrestrial BS, and relays.

FIG. 2 illustrates another example of an ED 110 and network devices, including a base station 170*a*, 170*b* (at 170) and an NT-TRP 172. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IoT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170*a* and 170*b* is a T-TRP and will hereafter be referred to as T-TRP 170. Also shown in FIG. 4A, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1A or 1B). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 210 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distributed unit (DU), positioning node, among other possibilities. The T-TRP 170 may be macro BSs, pico BSs, relay node, donor node, or the like, or combinations thereof. The T-TRP 170 may refer to the forging devices, or to apparatus (e.g. communication module, modem, or chip) in the forgoing devices. While the figures and accompanying description of example and embodiments of the disclosure generally use the terms AP, BS, and AP or BS, it is to be understood that such device could be any of the types described above.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g., multiple-input multiple-output (MIMO) precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

The T-TRP 170, the NT-TRP 172, and/or the ED 110 may include other components, but these have been omitted for the sake of clarity.

One or more steps of the embodiment methods provided herein may be performed by corresponding units or modules, according to FIG. 2. FIG. 2 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Figure 3:
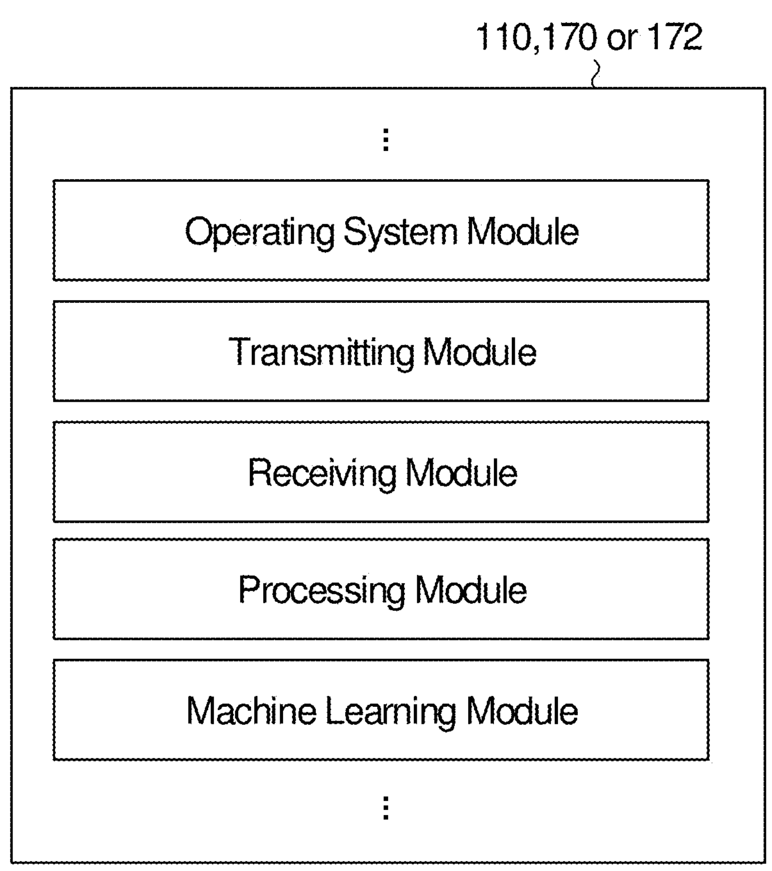
FIG. 3 is a block diagram illustrating units or modules in a device in which embodiments of the disclosure may occur.

One or more steps of the embodiment methods provided herein may be performed by corresponding units or modules, according to FIG. 3. FIG. 3 illustrates units or modules in a device, such as in ED 110, in T-TRP 170, or in NT-TRP 172. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

For future wireless networks, a number of the new devices could increase exponentially with diverse functionalities. Also, many new applications and new use cases in future wireless networks than existing in 5G may emerge with more diverse quality of service demands. These will result in new key performance indications (KPIs) for the future wireless network (for an example, 6G network) that can be extremely challenging, so the sensing technologies, and AI technologies, especially ML (deep learning) technologies, had been introduced to telecommunication for improving the system performance and efficiency.

AI/ML technologies applied communication including AI/ML communication in Physical layer and AI/ML communication in media access control (MAC) layer. For physical layer, the AI/ML communication may be useful to optimize the components design and improve the algorithm performance, like AI/ML on channel coding, channel modelling, channel estimation, channel decoding, modulation, demodulation, MIMO, waveform, multiple access, PHY element parameter optimization and update, beam forming & tracking and sensing & positioning, etc. For MAC layer, AI/ML communication may utilize the AI/ML capability with learning, prediction and make decisions to solve the complicated optimization problems with better strategy and optimal solution, for example to optimize the functionality in MAC, e.g. intelligent TRP management, intelligent beam management, intelligent channel resource allocation, intelligent power control, intelligent spectrum utilization, intelligent MCS, intelligent hybrid automatic repeat request (HARQ) strategy, intelligent transmit/receive (Tx/Rx) mode adaption, etc.

AI/ML architectures usually involve multiple nodes, which can be organized in two modes, i.e., centralized and distributed, both of which can be deployed in access network, core network, or an edge computing system or third-party network. The centralized training and computing architecture is restricted by huge communication overhead and strict user data privacy. Distributed training and computing architecture comprise several frameworks, e.g., distributed machine learning and federated learning. AI/ML architectures comprises intelligent controller which can perform as single agent or multi-agent, based on joint optimization or individual optimization. New protocol and signaling mechanism is needed so that the corresponding interface link can be personalized with customized parameters to meet particular requirements while minimizing signaling overhead and maximizing the whole system spectrum efficiency by personalized AI technologies.

Further terrestrial and non-terrestrial networks can enable a new range of services and applications such as earth monitoring, remote sensing, passive sensing and positioning, navigation, and tracking, autonomous delivery and mobility. Terrestrial networks based sensing and non-terrestrial networks based sensing could provide intelligent context-aware networks to enhance the UE experience. For example, terrestrial networks based sensing and non-terrestrial networks based sensing may involve opportunities for localization and sensing applications based on a new set of features and service capabilities. Applications such as THz imaging and spectroscopy have the potential to provide continuous, real-time physiological information via dynamic, non-invasive, contactless measurements for future digital health technologies. Simultaneous localization and mapping (SLAM) methods will not only enable advanced cross reality (XR) applications but also enhance the navigation of autonomous objects such as vehicles and drones. Further in terrestrial and non-terrestrial networks, the measured channel data and sensing and positioning data can be obtained by the large bandwidth, new spectrum, dense network and more light-of-sight (LOS) links. Based on these data, a radio environmental map can be drawn through AI/ML methods, where channel information is linked to its corresponding positioning or environmental information to provide an enhanced physical layer design based on this map.

Sensing coordinators are nodes in a network that can assist in the sensing operation. These nodes can be standalone nodes dedicated to just sensing operations or other nodes (for example TRP 170, ED 110, or core network node) doing the sensing operations in parallel with communication transmissions. A new protocol and signaling mechanism is needed so that the corresponding interface link can be performed with customized parameters to meet particular requirements while minimizing signaling overhead and maximizing the whole system spectrum efficiency.

AI/ML and sensing methods are data-hungry. In order to involve AI/ML and sensing in wireless communications, more and more data are needed to be collected, stored, and exchanged. The characteristics of wireless data expand quite large ranges in multiple dimensions, e.g., from sub-6 GHz, millimeter to Terahertz carrier frequency, from space, outdoor to indoor scenario, and from text, voice to video. These data collecting, processing and usage operations are performed in a unified framework or a different framework.

A precoder matrix W can be expressed in vector form (vectorized) as follows:

$$W_{N_{tx}\times N_{sb}} \rightarrow w_{N_{tx}\times N_{sb}\times 1} \quad (3)$$

wherein the precoder matrix has a size of $N_{tx}$ columns and $N_{sb}$ rows, where Ne is a number of transmit antennas and $N_{sb}$ is a number of sub-bands. In the vector form all of the $N_{tx}\times N_{sb}$ matrix elements are represented in a single column in which the sub-band columns are concatenated into the single column. There may be alternative ways or generating a vector form, as long as the UE and base station are each aware of how the vector form is generated.

A joint space-frequency subspace may be expressed as a vectorized precoder matrix in the following form:

$$w = B_{N_{tx}N_{sb}\times Q}\tilde{w}_{Q\times 1} \quad (4)$$

where the precoder matrix w is a product of matrix B having a size of $N_{tx}\times N_{sb}$ rows by Q columns, where Q is a number of vectors in the joint space-frequency subspace and the vector $\tilde{w}_{Q\times 1}$ having a size that is a single row by Q columns. It should be understood that the variable Q is considered to be a design parameter. The larger the value of Q, the less CSI compression will occur. The value of Q is a number of chosen vectors to represent the joint space-frequency subspace.

Given the above representation of precoder matrix w, the UE may send compressed CSI in the form of indices identifying vectors in the joint space-frequency subspace and the corresponding coefficients, i.e., $\tilde{w}_{Q\times 1}$, to the base station. Once the base station receives the indices identifying the joint space-frequency subspace vectors and the corresponding coefficients, the base station can regenerate the precoder matrix based on its knowledge of the entire joint space-frequency subspace. The base station can use the indices provided by the UE to determine the $B_{N_{tx}N_{sb}\times Q}$ matrix and then multiplying by the corresponding coefficients in the vector $\tilde{w}_{Q\times 1}$.

Applying a vectorization format in the manner of equation (4), where B is derived from $W_s$ and $W_f$, results in the equation $$B = W_f^{*T} \otimes W_s \quad (5)$$

where $W_s$ defines the antenna (space) subspace and $W_f$ defines the sub-band (frequency) subspace. In New Radio (NR), columns of $W_s$ are DFT/2D-DFT vectors and columns of Ware DFT vectors. In some embodiments, the columns of $W_s$ are oversampled DFT/2D-DFT vectors and the columns of $W_f$ are oversampled DFT vectors.

Figure 4:
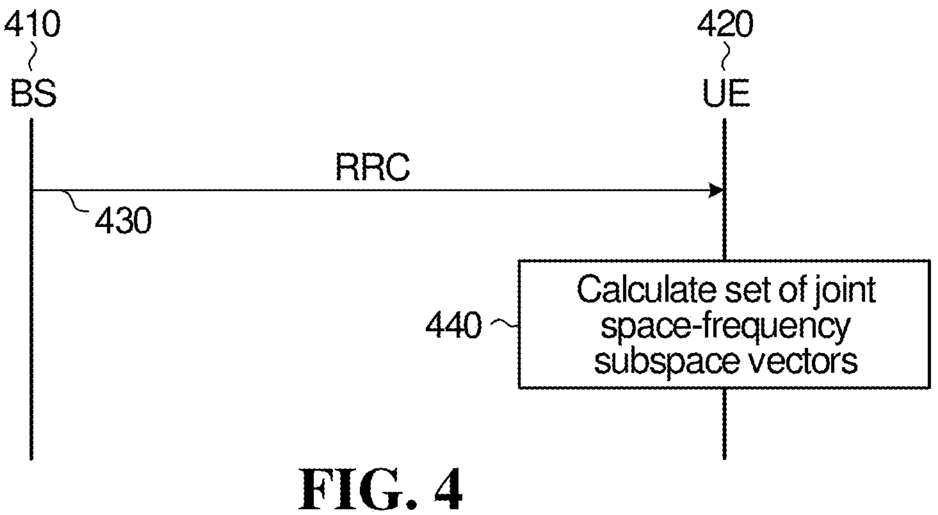
FIG. 4 is an example of a signaling flow diagram for signaling between a base station and a user equipment (UE) to enable the UE to determine a set of joint space-frequency subspaces according to an aspect of the disclosure.

Some aspects of the disclosure involve configuring the UE with parameters so that the UE may determine a set of joint space-frequency subspace vectors to allow the UE to perform CSI feedback compression. In particular, the CSI feedback compression may be considered to be precoder matrix feedback compression. FIG. 4 illustrates an example of a signal flow diagram for signaling that occurs between a base station (BS) 410 and a UE 420.

Step 430 involves the base station, or more generally some type of network equipment that is part of the network that the base station 410 and UE 420 are part of, sending parameters pertaining to antennas being used by the base station and sub-bands used by the base station to the UE 420 through higher layer signaling. An example of high layer signaling is radio resource control (RRC) signaling. Examples of antenna parameters may include one or more of a number of transmit antenna elements in a vertical dimension, a number of transmit antenna elements in a horizontal dimension, and oversampling factors corresponding to vertical and/or horizontal dimensions. While vertical and horizontal dimensions have a particular meaning, more generally these may be considered to be a first dimension and a second dimension normal to the first dimension. Examples of sub-band parameters include the DFT length corresponding to the number of sub-bands and the oversampling factor.

The parameters that are provided by the base station 410 to the UE 420 may be used by the UE 420 to determine the set of joint space-frequency subspace vectors where columns of $W_s$ and $W_f$ are selected from. Similarly, the parameters may be used to define the set of joint space-frequency subspace vectors that the columns of $B_{N_{tx}N_{sb}\times Q}$ are selected from.

At step 440, based on the parameters received from the base station 410 at step 430, the UE 420 determines a set of joint space-frequency (antenna-sub-band) subspace vectors.

After steps 430 and 440, the base station 410 and the UE 420 have a common understanding of the set of joint space-frequency vectors that may be selected at the UE 420 as the columns that form the matrix $B_{N_{tx}N_{sb}\times Q}$ for feeding back the compressed precoder matrix information, as will be described in further detail below.

Figure 5:
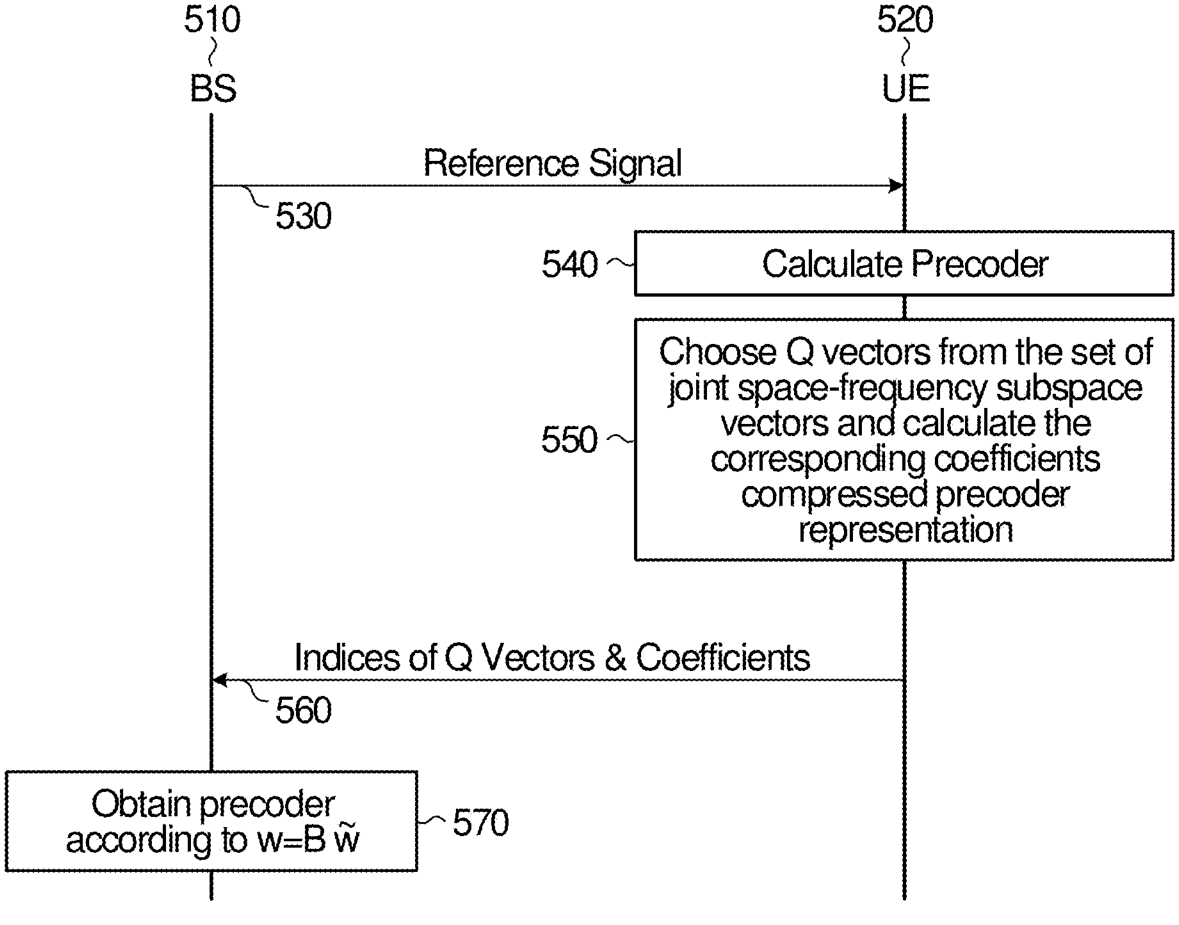
FIG. 5 is an example of a signaling flow diagram for signaling between a base station and a UE to enable the UE to feedback compressed CSI information based on a set of joint space-frequency subspaces according to an aspect of the disclosure.

Another aspect of the disclosure is directed to CSI acquisition and compressed precoder matrix feedback. FIG. 5 illustrates an example of a signal flow diagram for signaling that occurs between a base station (BS) 510 and a UE 520. Base station 510 and UE 520 may be the same base station 410 and UE 420 illustrated in FIG. 4. In some embodiments, the method of FIG. 4 may be a preliminary method to the method shown in FIG. 5.

Step 530 involves the base station 510, or a network equipment in the same network as the base station 510 sending a reference signal to the UE 520. The reference signal may be a channel state information reference signal (CSI-RS)

Steps 540 and 550 involve the UE 520 determining compressed precoder matrix feedback to send to the base station 510.

Step 540 involves the UE 520 measuring the reference signal at the UE 520 sent by the base station 510 in step 530. The UE 520 determines a precoder. The precoder may be determined with regard to a particular number of transmission layers R and/or for a particular number of sub-bands $N_{sb}$.

Step 550 involves the UE 520 choosing a particular number Q of vectors from the set of joint antenna-sub-band space vectors that is known to the UE 520. The set of joint antenna-sub-band space vectors may be represented by equation (5) for an appropriate representation of a vectorized precoder. In some embodiments, the UE 520 may determine the set of joint antenna-sub-band space vectors that the Q vectors, each having an associated index for identification, are selected from to generate the compressed precoder feedback information as a preliminary step in a manner similar to that described above with reference to FIG. 4. In some embodiments, the UE 520 may be provided the set of joint antenna-sub-band space vectors by the base station 510 that the Q vectors are selected from to generate the compressed precoder feedback. Also at step 550, the UE 520 determines coefficients associated with each of the Q vectors, i.e. $\tilde{w}_{Q\times 1}$. If a number of the columns of B (out of which Q will be chosen) does not exceed the number of rows (where B has a size $N_{tx}\times N_{sb}$), a vector of coefficients can be obtained by multiplying w by a pseudo inverse of B. If the number of columns of B exceeds the number of rows of B, an algorithm such as a matching pursuit can be used to obtain Q vectors and the corresponding coefficients.

Step 560 involves the UE 510 sending the compressed precoder feedback information to the base station 520. Step 560 involves the UE 520 sending the indices of the Q vectors to the base station 510. Sending only the indices of the Q vectors is generally more bandwidth efficient than sending all of the data of the Q vectors. Indices of the Q vectors can be sent and used by the base station because the base station and UE share a common frame of reference to set of joint antenna-sub-band space vectors used by the UE to generate the compressed precoder feedback information from the determined precoder in step 540. Step 560 also involves the UE 520 sending the determined corresponding coefficients to the base station 510. The indices of the Q vectors and the determined corresponding coefficients may be sent in a single message.

Step 570 involves the base station reconstructing the precoder w according to using equation (4) by using the compressed feedback sent by the UE 510 in step 560 and knowledge by the base station 510 of the set of joint antenna-sub-band subspace vectors used by the UE to select the indices of the Q vectors provided in the compressed precoder feedback information.

Compared to existing CSI acquisition methods, methods described herein related to determining a set of joint antenna-sub-band subspace vectors and using a set of joint antenna-sub-band subspace vectors to generate compressed precoder feedback may provide more flexibility in selecting a set of Q vectors out of all possible vectors in the set of joint space-frequency subspace vectors. For example, with a set of vectors having a size equal to the value of the product of $N_{tx}\times N_{sb}$, a number of possibilities for selection in methods described herein will be represented as $$\binom{N_{tx}N_{sb}}{Q}$$

for Q vectors, selected from the set of vectors $N_{tx}\times N_{sb}$. In comparison, a number of possibilities would be $$\binom{N_{tx}}{L}\binom{N_{sb}}{M}$$

for a CSI acquisition method proposed in NR Rel. 16. Therefore, if Q=LM, this would result in an equal amount of precoder feedback overhead for the method proposed herein as compared to the NR Rel. 16 method. However, it should be noted that $$\binom{N_{tx}N_{sb}}{Q}\geq\binom{N_{tx}}{L}\binom{N_{sb}}{M}$$

that enables more compression by being able to consider more possibilities.

Another aspect of the disclosure includes configuration of a set of joint space-frequency subspace vectors in a different manner that providing parameters to the UE to determine the set of vectors described above and generating and providing compressed precoder feedback from the UE to the base station. In some embodiments of this aspect of the disclosure, the matrix B is not obtained based on $W_s$ and $W_f$. Instead, the matrix B is obtained using data-based methods, that may include machine learning (ML) or artificial intelligence (AI). For example, principal component analysis (PCA) can be used to obtain most significant singular vectors corresponding to precoders from the joint antenna-sub-band subspace that have been used in the past. For example, the vectors for matrix B may be determined based on historically obtained channel state information (CSI) feedback from one or more UEs.

Figure 6:
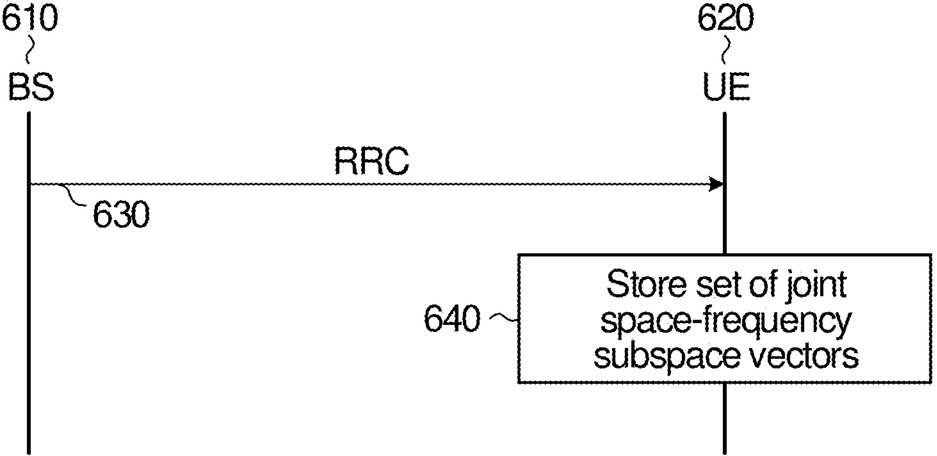
FIG. 6 is an example of a signaling flow diagram for signaling between a base station and a UE to enable the UE to determine a set of joint space-frequency subspaces according to an aspect of the disclosure.

Some aspects of the disclosure involve configuring the UE with configuration information that includes an explicit or implicit indication of a set of joint space-frequency subspace vectors that can be used by the UE to perform compression of the CSI. This may be also referred to as compression of the precoder information being fed back to the base station. FIG. 6 illustrates an example of a signal flow diagram for signaling that occurs between a base station (BS) 610 and a UE 620.

Step 630 involves the base station 610, or more generally network equipment that is part of the network that the base station 610 and UE 620 are part of, sending through higher layer signaling (such as RRC), a set of joint antenna-sub-band subspace vectors either explicitly, or implicitly through parameters, formulas, etc. In some embodiments, the set of vectors may be columns of the matrix B.

At step 640, when the set of vectors received from the base station 610 at step 630 are explicitly provided, the UE 620 stores the vectors of the set of joint space-frequency subspace. When the set of vectors received from the base station 610 at step 630 are implicitly provided, the UE 620 may use the information that is implicitly provided to generate the set of vectors and then store the vectors for later use.

After steps 630 and 640, the base station 610 and the UE 620 have a common understanding of the set of joint antenna-sub-band subspace vectors that Q vectors may be selected from as part of a method for feeding back compressed precoder information as will be described in further detail below.

Another aspect of the disclosure is directed to CSI acquisition, generating compressed precoder feedback information and sending the compressed precoder feedback information from the UE to the base station. This aspect may be performed in a manner similar to that as described in FIG. 5, in which the UE 520 measures reference signals sent by the base station 520, determines a precoder matrix in which each column of the precoder matrix has a corresponding index that can be used to identify the column, chooses the Q vectors based on the determined precoder matrix, calculates the corresponding coefficient matrix $\hat{w}$ as indicated in equation (4), and sends the compressed precoder matrix information including indices of the Q vectors and the coefficient matrix $\hat{w}$ to the base station 510. The precoder is determined for each layer as appropriate.

A main difference in this embodiment is that the matrix B from which the Q vectors are selected from is obtained from data based methods, such as ML or AI. The base station can determine the precoder matrix w according to equation (4) based on the compressed precoder information received from the UE. 520 and the knowledge at the base station of the matrix B to identify the columns in the matrix based on the indices of the Q vectors in the received compressed precoder information.

In addition to advantages described above resulting from vectorization, embodiments in which the matrix B is obtained using data-based methods may further enjoy the benefit of a customized set of vectors which can be selected at the UE to generate compressed precoder feedback according to the propagation environment. Such data-based methods of obtaining the matrix B may result in improved compression performance.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed:

1. A method comprising:

transmitting joint space-frequency subspace configuration information for use by a user equipment (UE) to determine a compressed precoder, wherein a joint space-frequency subspace indicated by the joint space-frequency subspace configuration information combines information of an antenna subspace and a frequency subspace into a single subspace.

2. The method of claim 1, wherein the joint space-frequency subspace configuration information comprises antenna parameter information and sub-band parameter information to determine a first set of joint space-frequency subspace vectors for use at the UE that are consistent with a second set of joint space-frequency subspace vectors known at a base station transmitting the joint space-frequency subspace configuration information.

3. The method of claim 2, wherein the antenna parameter information indicates at least one of:

a first number of antenna elements in an antenna in a first direction;

a second number of antenna elements in the antenna in a second direction perpendicular to the first direction;

a first oversampling factor corresponding to the first direction; or a second oversampling factor corresponding to the second direction.

4. The method of claim 2, wherein the sub-band parameter information indicates at least one of:

a discrete Fourier transform (DFT) length corresponding to a number of sub-bands; or an oversampling factor.

5. The method of claim 1, wherein the joint space-frequency subspace configuration information includes a set of joint space-frequency subspace vectors.

6. A device comprising:

one or more processors; and a non-transitory computer-readable storage medium storing programming instructions that, when executed by the one or more processors, cause the device to perform operations including:

transmitting joint space-frequency subspace configuration information for use by a user equipment (UE) to determine a compressed precoder, wherein a joint space-frequency subspace indicated by the joint space-frequency subspace configuration information combines information of an antenna subspace and a frequency subspace into a single subspace.

7. The device of claim 6, wherein the joint space-frequency subspace configuration information comprises antenna parameter information and sub-band parameter information to determine a first set of joint space-frequency subspace vectors for use at the UE that are consistent with a second set of joint space-frequency subspace vectors known at a base station transmitting the joint space-frequency subspace configuration information.

8. The device of claim 7, wherein the antenna parameter information indicates at least one of:

a first number of antenna elements in an antenna in a first direction;

a second number of antenna elements in the antenna in a second direction perpendicular to the first direction;

a first oversampling factor corresponding to the first direction; or a second oversampling factor corresponding to the second direction.

9. The device of claim 7, wherein the sub-band parameter information indicates at least one of:

a discrete Fourier transform (DFT) length corresponding to a number of sub-bands; or an oversampling factor.

10. The device of claim 6, wherein the joint space-frequency subspace configuration information includes a set of joint space-frequency subspace vectors.

11. A method performed at a side of a base station, the method comprising:

receiving joint space-frequency subspace configuration information for use by a user equipment (UE) to determine a compressed precoder, wherein a joint space-frequency subspace indicated by the joint space-frequency subspace configuration information combines information of an antenna subspace and a frequency subspace into a single subspace.

12. The method of claim 11, wherein the joint space-frequency subspace configuration information comprises antenna parameter information and sub-band parameter information to determine a first set of joint space-frequency subspace vectors for use at the UE that are consistent with a second set of joint space-frequency subspace vectors known at the base station, the method further comprising:

determining the first set of joint space-frequency subspace vectors based on the joint space-frequency subspace configuration information.

13. The method of claim 12, wherein the antenna parameter information indicates at least one of:

a first number of antenna elements in an antenna in a first direction;

a second number of antenna elements in the antenna in a second direction perpendicular to the first direction;

a first oversampling factor corresponding to the first direction; or a second oversampling factor corresponding to the second direction.

14. The method of claim 12, wherein the sub-band parameter information indicates at least one of:

a discrete Fourier transform (DFT) length corresponding to a number of sub-bands; or an oversampling factor.

15. The method of claim 11, wherein the joint space-frequency subspace configuration information includes a set of joint space-frequency subspace vectors.

16. A device at a side of a base station, the device comprising:

one or more processors; and a non-transitory computer-readable storage medium storing programming instructions that, when executed by the one or more processors, cause the device to perform operations including:

receiving joint space-frequency subspace configuration information for use by a user equipment (UE) to determine a compressed precoder, wherein a joint space-frequency subspace indicated by the joint space-frequency subspace configuration information combines information of an antenna subspace and a frequency subspace into a single subspace.

17. The device of claim 16, wherein the joint space-frequency subspace configuration information comprises antenna parameter information and sub-band parameter information to determine a first set of joint space-frequency subspace vectors for use at the UE that are consistent with a second set of joint space-frequency subspace vectors known at the base station, the operations further comprising:

determining the first set of joint space-frequency subspace vectors based on the joint space-frequency subspace configuration information.

18. The device of claim 17, wherein the antenna parameter information indicates at least one of:

a first number of antenna elements in an antenna in a first direction;

a second number of antenna elements in the antenna in a second direction perpendicular to the first direction;

a first oversampling factor corresponding to the first direction; or a second oversampling factor corresponding to the second direction.

19. The device of claim 17, wherein the sub-band parameter information indicates at least one of:

a discrete Fourier transform (DFT) length corresponding to a number of sub-bands; or an oversampling factor.

20. The device of claim 16, wherein the joint space-frequency subspace configuration information includes a set of joint space-frequency subspace vectors.

* * * * *